United States Patent
Takahashi et al.

(10) Patent No.: US 7,050,238 B2
(45) Date of Patent: May 23, 2006

(54) POWER COMBINATION OPTICAL SYSTEM AND LIGHT SOURCE MODULE

(75) Inventors: Akira Takahashi, Iwate (JP); Masaharu Odashima, Iwate (JP); Shigeru Umeki, Iwate (JP); Katsuya Kusaka, Iwate (JP); Hiroaki Takahashi, Iwate (JP); Hiroyuki Anbe, Iwate (JP); Ichiroh Oikawa, Iwate (JP); Mitsuhiro Kudou, Iwate (JP)

(73) Assignee: Ricoh Optical Industries Co., Ltd., Hanamaki (JP)

( * ) Notice: Subject to any disclaimer, the term of this patent is extended or adjusted under 35 U.S.C. 154(b) by 0 days.

(21) Appl. No.: 10/951,584

(22) Filed: Sep. 29, 2004

(65) Prior Publication Data

US 2005/0073750 A1    Apr. 7, 2005

(30) Foreign Application Priority Data

Oct. 7, 2003    (JP)    ............................. 2003-348287

(51) Int. Cl.
    *G02B 13/08*    (2006.01)
    *G02B 13/10*    (2006.01)

(52) U.S. Cl. ...................................... 359/669; 359/668

(58) Field of Classification Search ........ 359/668–671, 359/207

See application file for complete search history.

(56) References Cited

U.S. PATENT DOCUMENTS

| 6,754,246 B1 * | 6/2004 | Okada ...................... 372/50.23 |
| 6,801,375 B1 * | 10/2004 | Hayashide .................. 359/819 |
| 6,813,303 B1 * | 11/2004 | Matsuda et al. .............. 372/75 |

FOREIGN PATENT DOCUMENTS

| JP | 2848279 | 11/1998 |
| JP | 3228098 | 9/2001 |
| JP | 2002-202442 | 7/2002 |

* cited by examiner

Primary Examiner—Ricky Mack
Assistant Examiner—Jack Dinh
(74) Attorney, Agent, or Firm—Oblon, Spivak, McClelland, Maier & Neustadt, P.C.

(57) ABSTRACT

An optical system includes a plurality of separate light sources with a number M of the light sources arranged in a first direction and a number N of the light sources arranged in a second direction. Each of the light sources has an asymmetric light emission area. The light sources are arranged so that a light beam passing a collimator optical element has a beam width in the first direction greater than a beam width in the second direction. An anamorphic optical element is arranged to have a beam-size reduction rate in the first direction greater than a beam-size reduction rate in the second direction and converts the plurality of light beams from the light sources into a light beam having a symmetric beam cross-section. A light-condensing optical element condenses the light beam having the symmetric beam cross-section into a light receiving element, and the anamorphic optical element includes an array of a number of prisms integrally arranged.

21 Claims, 12 Drawing Sheets

FIG.2

| ITEM | SYMBOL | SPECIFIED CHARACTERISTICS | DESIGNED CHARACTERISTICS |
|---|---|---|---|
| NUMBER OF LD | M × N (HORIZONTAL × VERTICAL) | | ○ |
| NA OF LD | $NA_V$<br>$NA_H$<br>$NA_H < NA_V$ | ○ | |
| SIZE OF LD EMISSION AREA | $EA_V$<br>$EA_H$<br>$EA_H > EA_V$ | ○ | |
| NA OF FIBER | $NA_F$ | ○ | |
| FIBER CORE DIAMETER | FD | ○ | |
| LD PITCH | $P_X$ (HORIZONTAL)<br>$P_Y$ (VERTICAL) | | ○ |
| FOCAL LENGTH OF L1 | $f_1$ | | ○ |
| NA OF L1 | $NA_{L1}$ | | ○ |
| FOCAL LENGTH OF L2 | $f_2$ | | ○ |
| NA OF L2 | $NA_{L2}$ | | ○ |
| BEAM REDUCTION RATE OF ANAMORPHIC OPTICAL ELEMENT | MX | | ○ |
| COLLIMATOR DIAMETER AFTER L1 | $D_X$ (HORIZONTAL)<br>$D_Y$ (VERTICAL) | | ○ |
| BEAM SIZE BEFORE ANAMORPHIC OPTICAL ELEMENT | $X_0$ (HORIZONTAL)<br>$Y_0$ (VERTICAL) | | ○ |
| BEAM SIZE AFTER ANAMORPHIC OPTICAL ELEMENT | $X_1$ (HORIZONTAL)<br>$Y_0$ (VERTICAL) | | ○ |
| MAGNIFICATION | $\beta_X$ (HORIZONTAL)<br>$\beta_Y$ (VERTICAL) | | ○ |
| SIZE OF CONDENSED LIGHT BEAM | $W_X$ (HORIZONTAL)<br>$W_Y$ (VERTICAL) | | ○ |

FIG.13
| NAME OF OPTICAL ELEMENT | CONDENSING COAXIAL ELEMENT | CONDENSING ANAMORPHIC ELEMENT |
|---|---|---|
| VIEW OF OUTGOING BEAM | 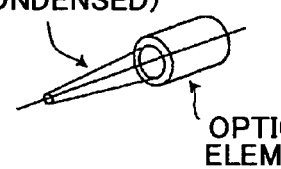 OUTGOING BEAM (CONDENSED), OPTICAL ELEMENT | 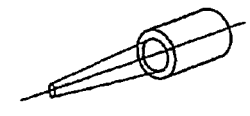 |
| BEAM SHAPE | CIRCLE | ELLIPSE (LINE SHAPED) |
| ILLUMINANCE (WITHOUT UNIFICATION ELEMENT) | 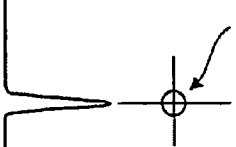 ILLUMINANCE (VERTICAL DIRECTION), BEAM SHAPE, ILLUMINANCE (HORIZONTAL DIRECTION) |  |
| ILLUMINANCE (WITH UNIFICATION ELEMENT) |  | 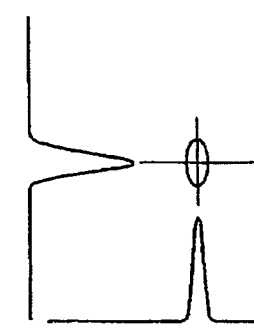 |

FIG.14

| NAME OF OPTICAL ELEMENT | COLLIMATOR COAXIAL ELEMENT | COLLIMATOR ANAMORPHIC ELEMENT |
|---|---|---|
| VIEW OF OUTGOING BEAM | OUTGOING BEAM (PARALLEL) / OPTICAL ELEMENT | |
| BEAM SHAPE | CIRCLE | ELLIPSE (LINE SHAPED) |
| ILLUMINANCE (WITHOUT UNIFICATION ELEMENT) | ILLUMINANCE (VERTICAL DIRECTION), BEAM SHAPE, ILLUMINANCE (HORIZONTAL DIRECTION) | |
| ILLUMINANCE (WITH UNIFICATION ELEMENT) | | |

FIG.15
| NAME OF OPTICAL ELEMENT | DIVERGENT COAXIAL ELEMENT | DIVERGENT ANAMORPHIC ELEMENT |
|---|---|---|
| VIEW OF OUTGOING BEAM | 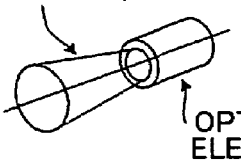 | 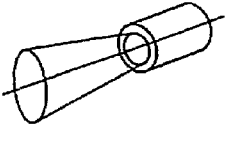 |
| BEAM SHAPE | CIRCLE | ELLIPSE (LINE SHAPED) |
| ILLUMINANCE (WITHOUT UNIFICATION ELEMENT) | 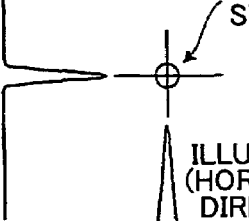 |  |
| ILLUMINANCE (WITH UNIFICATION ELEMENT) |  | 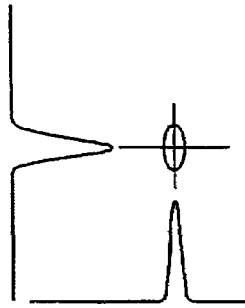 |

POWER COMBINATION OPTICAL SYSTEM AND LIGHT SOURCE MODULE

BACKGROUND OF THE INVENTION

1. Field of the Invention

The present invention relates to an optical system capable of efficiently condensing light from a plurality of light sources into an optical element, and a light source module including such an optical system.

2. Description of the Related Art

In the related art, for example, Japanese Patent Gazette No. 3228098, Japanese Patent Gazette No. 2848279, and Japanese Laid-Open Patent Application No. 2002-202442 disclose an optical system that condenses light from a plurality of light sources, such as semiconductor lasers (LD) or light emission diodes (LED), into an optical element, such as an optical fiber. Specifically, in the optical system, light beams from the light sources are converted to a parallel light beam by a collimator lens, the parallel light beam is condensed by a condensing lens having a large diameter, and then the condensed light is directed into the optical fiber.

When it is desired to make the optical system compact by reducing the thickness of the optical system, it may be attempted to reduce the number of the light sources in the optical system arranged in the perpendicular direction, but this results in an increase of the number of the light sources arranged in the horizontal direction in the optical system (for example, the optical system has a rectangular shape).

In order to direct the condensed light into an optical element having a limited NA (Numerical Aperture), such as an optical fiber, it is necessary to limit the NA of the condensed light obtained by the condensing lens to be less than the NA of the optical element, and this requires the NA of the condensed light to be optimized in the horizontal direction, in which way many light sources are arranged. For this purpose, the diameter and focal length of the condensing lens become large, the optical path of the optical system becomes long, and this makes the optical system large. When the focal length of the condensing lens is large, the magnification of the optical system increases, and the diameter of the light beam increases. If the area of the optical element for receiving the condensed light is small, such as the core of the optical fiber, the condensed light cannot be completely directed within the receiving area, and hence the efficiency of light transmission decreases.

SUMMARY OF THE INVENTION

It is a general object of the present invention to solve one or more problems of the related art.

A specific object of the present invention is to provide an optical system that can be made small, has a short light path, and is capable of efficiently condensing light from a plurality of light sources into a light receiving optical element; and a light source module including such an optical system.

According to a first aspect of the present invention, there is provided an optical system for condensing a plurality of light beams and directing the condensed light beam to a light-receiving optical element. The optical system includes a plurality of light sources that generates the light beams, and a light condensing portion that condenses the light beams from the light sources and directs the condensed light beam to the light receiving optical element.

The light sources are arranged as an array with a number of M light sources being arranged in a first direction and a number of N light sources being arranged in a second direction (assuming M>N, and M, N>1).

The light condensing portion includes a collimator optical element, an anamorphic optical element, and a light-condensing optical element. The anamorphic optical element is arranged such that the magnification of the anamorphic optical element in the first direction is greater than the magnification of the anamorphic optical element in the second direction.

As an embodiment, a reflection optical element is arranged between the anamorphic optical element and the light-condensing optical element.

As an embodiment, the light-condensing optical element includes at least one of a condensing lens, a lens having a refractive index distribution, a Fresnel lens, a diffractive optical element, and a hologram element.

As an embodiment, the light-condensing optical element includes at least one of a glass lens fabricated by grinding, a glass molded lens, a resin molded lens, and a lens fabricated by etching.

As an embodiment, the light-condensing optical element and the reflection optical element are integrated to be a reflection-condensing optical element. For example, the reflection-condensing optical element includes at least one of a concave mirror and a hologram element.

As an embodiment, each of the light sources includes a semiconductor laser, and the light-receiving optical element includes an optical fiber.

As an embodiment, each of the semiconductor lasers has a light emission area of different widths in different directions, and the semiconductor lasers are arranged to have such an orientation that a direction corresponding to a larger width of the light emission area is in the direction of the smaller magnification of the anamorphic optical element, and a direction corresponding to a smaller width of the light emission area is in the direction of the larger magnification of the anamorphic optical element.

As an embodiment, a core of the optical fiber has a diameter less than 100 μm, and a numerical aperture (NA) less than 0.35.

As an embodiment, each of the light sources has a light emission area having different widths in different directions, and the light sources are arranged to have such an orientation that a direction corresponding to a larger width of the light emission area is in the direction of the smaller magnification of the anamorphic optical element, and a direction corresponding to a smaller width of the light emission area is in the direction of the larger magnification of the anamorphic optical element.

As an embodiment, each of the light sources includes at least one of a light emission diode, an electro-luminescence emitter, a VCSEL (Vertical Cavity Surface Emitting Laser), and a lamp.

As an embodiment, the light beams include light beams output from an optical fiber or a light wave guide which propagates light emitted from at least one of a semiconductor laser, a light emission diode, an electro-luminescence emitter, a VCSEL (Vertical Cavity Surface Emitting Laser), and a lamp.

As an embodiment, the light-receiving optical element is an optical element having an opening such as an optical fiber, an optical wave guide, a light tunnel, and a pin hole.

As an embodiment, the anamorphic optical element includes a prism. For example, the anamorphic optical element includes a large-size integral prism, or an array of a number of independent small prisms, or an integrated array of the small prisms. Alternatively, the anamorphic optical element includes at least one of a cylindrical lens, a cylindrical mirror, a hologram element, and a diffractive optical element.

As an embodiment, the collimator optical element includes at least one of a collimator lens, a lens having a refractive index distribution, a Fresnel lens, a diffractive optical element, and a hologram element.

As an embodiment, the collimator optical element includes at least one of a glass lens fabricated by grinding, a glass molded lens, a resin molded lens, and a lens fabricated by etching.

As an embodiment, the collimator optical element includes one of an assembly of a plurality of single lenses and an integrated lens array.

According to a second aspect of the present invention, there is provided a light source module including a power combination optical system. The power combination optical system includes plural light sources that generate the light beams, and a light condensing portion that condenses the light beams from the light sources and directs the condensed light beam to a light receiving optical element.

The light sources are arranged as an array with a number of M light sources arranged in a first direction and a number of N light sources arranged in a second direction (assuming M>N, and M, N>1). The light condensing portion includes a collimator optical element, an anamorphic optical element, and a light-condensing optical element. The anamorphic optical element is arranged such that the magnification of the anamorphic optical element in the first direction is greater than the magnification of the anamorphic optical element in the second direction.

As an embodiment, the light source module further includes a beam-processing optical element provided at an output end of the light-receiving optical element for processing a light beam from the light-receiving optical element.

As an embodiment, the beam-processing optical element includes one of a condensing coaxial optical element and a condensing anamorphic optical element to condense the light beam from the light-receiving optical element.

As an embodiment, the beam-processing optical element includes one of a collimator coaxial optical element and a collimator anamorphic optical element to covert the light beam from the light-receiving optical element to a parallel light beam.

As an embodiment, the beam-processing optical element includes one of a divergent coaxial optical element and a divergent anamorphic optical element to diverge the light beam from the light-receiving optical element.

As an embodiment, the light source module further includes an illuminance unification optical element that makes uniform the illuminance distribution of the light beam from the light-receiving optical element or the light beam from the beam-processing optical element.

According to the present invention, the optical system includes a plurality of light sources that generates a plurality of light beams, and a light condensing portion that condenses the light beams from the light sources and directs the condensed light beam to the light receiving optical element. The light sources are arranged as an array with a number of M light sources arranged in a first direction and a number of N light sources arranged in a second direction (assuming M>N, and M, N>1). The light condensing portion includes a collimator optical element, an anamorphic optical element, and a light-condensing optical element. The anamorphic optical element is arranged such that the magnification of the anamorphic optical element in the first direction is greater than the magnification of the anamorphic optical element in the second direction.

Due to the anamorphic optical element, the width of the light beam in the horizontal direction becomes approximately equal to that in the vertical direction, and this reduces the diameter and the focal length of the condensing lens (in turn, the light path of the optical system) compared with the optical system in the related art, thereby enabling reduction of the size of the whole optical system.

In addition, because the focal length becomes short, the magnification in the vertical direction is reduced, thus reducing the diameter of the condensed light beam. This reduced diameter increases the efficiency of light transmission to the light-receiving optical element, and makes it possible to obtain a light beam from the light-receiving optical element having a high output power.

The anamorphic optical element and the light sources are arranged while considering the numerical apertures and magnifications. Specifically, because the anamorphic optical element has different magnifications in the horizontal direction and the vertical direction, even when light sources like the semiconductor laser, whose light emission area has different widths in different directions, is used as the light source, provided that the semiconductor laser is arranged such that a direction corresponding to a larger width of the light emission area is in the direction of the smaller magnification of the anamorphic optical element, and a direction corresponding to a smaller width of the light emission area is in the direction of the larger magnification of the anamorphic optical element, the spot size of the condensed light beam can be reduced to be equal in all directions, and thus it is possible to efficiently direct the condensed light beam to a light-receiving optical element, such as an optical fiber or a light wave guide.

These and other objects, features, and advantages of the present invention will become more apparent from the following detailed description of preferred embodiments given with reference to the accompanying drawings.

BRIEF DESCRIPTION OF THE DRAWINGS

FIG. 1A shows the optical system in the horizontal plane (plan view), and FIG. 1B shows the optical system in the vertical direction viewed from the bottom to the top in FIG. 1A;

FIG. 2 is a table showing characteristics of the constituent elements of the optical system according to the present embodiment;

FIG. 3A is a view of the optical system in the horizontal plane, and FIG. 3B is a view of the optical system in the vertical direction viewed along an arrow A in FIG. 3A;

FIG. 10A is a view of the optical system in the horizontal plane, and FIG. 10B is a view of the optical system in the vertical direction;

FIG. 13 illustrates illuminance distributions and beam shapes of a condensed beam obtained by a condensing coaxial optical element or a condensing anamorphic optical element according to the 10th embodiment of the present invention;

FIG. 14 illustrates illuminance distributions and beam shapes of a parallel beam obtained by a collimator coaxial optical element or a collimator anamorphic optical element according to the 10th embodiment of the present invention; and FIG. 15 illustrates illuminance distributions and beam shapes of a divergent beam obtained by a divergent coaxial optical element or a divergent anamorphic optical element according to the 10th embodiment of the present invention.

DESCRIPTION OF THE PREFERRED EMBODIMENTS

Below, a fundamental configuration of an optical system according to the present invention and a method of designing the optical system are explained, first.

Figure 1A:
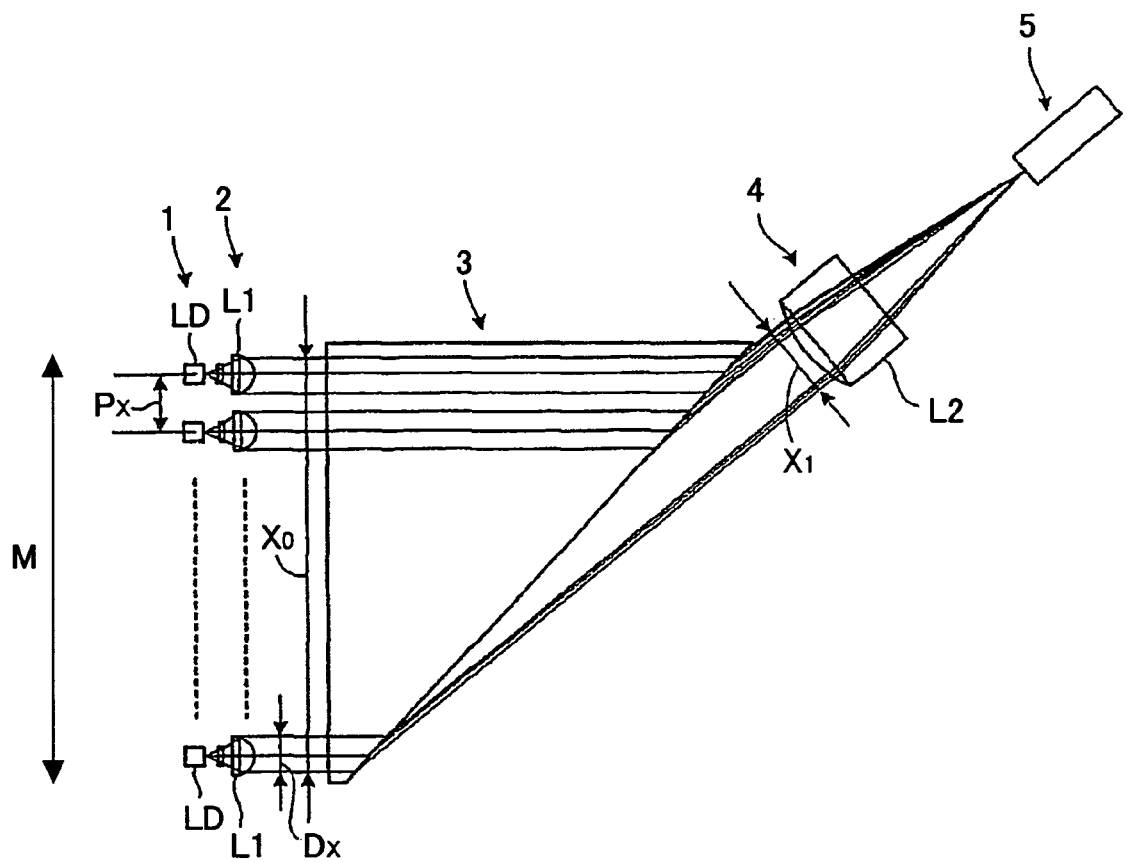
FIGS. 1A and 1B are schematic views of a general configuration of an optical system according to an embodiment of the present invention, where
Figure 1B:
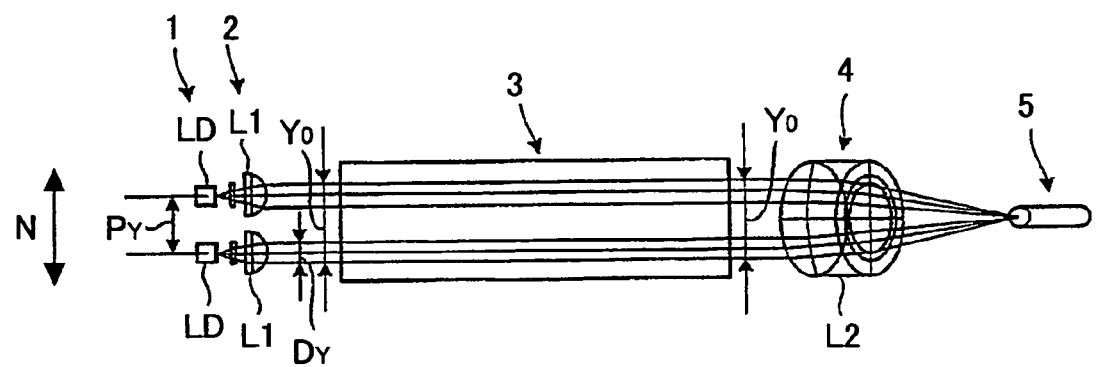

FIGS. 1A and 1B are schematic views of a general configuration of an optical system according to an embodiment of the present invention, where, FIG. 1A is a view of the optical system in the horizontal plane, and FIG. 1B is a view of the optical system in the vertical direction viewed from the bottom to the top in FIG. 1A.

In the optical system illustrated in FIG. 1A and FIG. 1B, light from a light source portion 1 having a plurality of light-sources is condensed by a light condensing portion, and is then directed to a light receiving optical element 5.

The light source portion 1 includes a number of M light sources arranged in the horizontal direction and a number of N light sources arranged in the vertical direction. Here, assume M is greater than N (M>N), and both M and N are greater than 1 (M, N>1).

The light condensing portion includes a collimator optical element 2, an anamorphic optical element 3, and a light-condensing optical element 4. The anamorphic optical element 3 is arranged in such way that the magnification of the anamorphic optical element 3 in the direction in which M light sources are arranged is larger than the magnification of the anamorphic optical element 3 in the direction in which N light sources are arranged.

In the optical system illustrated in FIG. 1A and FIG. 1B, light sources generating light in the same wavelength region are used as the M×N light sources of the light source portion 1. Specifically, the light sources may be semiconductor lasers (LD), light emission diodes (LED), electro-luminescence (EL) emitters, VCSELs (Vertical Cavity Surface Emitting Laser), or lamps. In addition, the semiconductor lasers, light emission diodes, and so on, may also be arranged as a light source array (an LD array or an LED array) to form the light source portion 1.

In the present embodiment, for example, the collimator optical element 2 includes the number M×N collimator lenses L1, which are arranged in correspondence to the light sources of the light source portion 1. The collimator lens L1 may be a common lens having a continual curved surface and a refractive index difference, or a lens having a refractive index distribution, or a Fresnel lens, or a diffractive optical element, or a hologram element. In addition, from the point of view of the fabrication method, the collimator lens L1 may be a glass lens fabricated by grinding, or a glass molded lens, or a resin molded lens, or a lens fabricated by etching. Further, each collimator lens L1 may be an assembly of a number of single lenses, or an integral lens array.

In the present embodiment, the anamorphic optical element 3 may include a prism. Specifically, the anamorphic optical element 3 may include a large-size one-piece prism, or an array of a number of independent small prisms, or an integrated array of the small prisms. Alternatively, the anamorphic optical element 3 may also include a cylindrical lens, or a cylindrical mirror, or a hologram element, or a diffractive optical element.

In the present embodiment, the light-condensing optical element 4 may be a common lens (L2) having a continual curved surface and a refractive index difference, or a lens having a refractive index distribution, or a Fresnel lens, or a diffractive optical element, or a hologram element. In addition, the collimator lens L1 may be a glass lens fabricated by grinding, or a glass molded lens, or a resin molded lens, or a lens fabricated by etching.

The light receiving optical element 5 may be an optical fiber, or an optical wave guide, or a light tunnel, or a pin hole.

In the following descriptions, it is assumed that the light source portion 1 includes M×N semiconductor lasers (LD) generating laser beams in the same wavelength region, and in the light condensing portion, the collimator optical element 2 includes M×N collimator lenses L1, the anamorphic optical element 3 includes a prism, the light-condensing optical element 4 includes a condensing lens (L2), the light receiving optical element 5 is an optical fiber, and light beams from the semiconductor lasers LD are condensed by the light condensing portion and are efficiently directed to the optical fiber 5.

In the present embodiment, in order to efficiently condense the light beams from the semiconductor lasers LD, (1) the total NA (Numerical Aperture) of the light beams is set to be less than the NA of the optical fiber, and (2) the magnification of the optical system is set to be sufficiently small so that the spot of the light beam condensed by the condensing lens L2 is less than the diameter of the core of the optical fiber 5.

Further, in order to make the optical system compact, (1) the light source portion 1 includes an array of M×N semiconductor lasers LD, wherein M semiconductor lasers LD are arranged in the horizontal direction, and N semiconductor lasers LD are arranged in the vertical direction (M>N, and M, N>1), (2) the anamorphic optical element 3 is used and arranged so that the width of the condensed light beam in the horizontal direction is approximately equal to that in the vertical direction, and this reduces the diameter and the focal length f2 of the condensing lens L2, hence reducing the size of the whole optical system, and (3) the direction corresponding to a larger width of the light emission area of each semiconductor laser LD is arranged in the direction in which the anamorphic optical element 3 has the smaller magnification, and the direction corresponding to a smaller width of the light emission area of each semiconductor laser LD is arranged in the direction in which the anamorphic optical element 3 has the larger magnification. Because of such an arrangement, the spot size of the condensed light beam is reduced to be equal in all directions.

FIG. 2 is a table showing characteristics of the constituent elements of the optical system according to the present embodiment. Some of the characteristics are specified as design conditions of the optical system, and the others are determined when designing the optical system.

The optical system illustrated in FIG. 1A and FIG. 1B is designed as follows. The quantities appearing below are described in the table in FIG. 2.

(1) Arranging the M×N Semiconductor Lasers LD

The V (vertical) direction of each semiconductor laser LD is set along the horizontal direction of the optical system, the H (horizontal) direction of each semiconductor laser LD is set along the vertical direction of the optical system, M semiconductor lasers LD are arranged along the direction ($EA_V$) corresponding to the smaller width of the light emission areas of the semiconductor lasers LD, and N semiconductor lasers LD are arranged along the direction ($EA_H$) corresponding to the larger width of the light emission areas of the semiconductor lasers LD.

(2) Calculating the Focal Length f1 of the Collimator Lens L1

By using the following equation (1) and an object value $Y_0$ of the thickness of the optical system, that is, the width of an optical effective area in the direction in which N semiconductor lasers LD are arranged, the quantity $D_Y$ (vertical collimator diameter after the lens L1) as shown in the table in FIG. 2 is obtained.

$$Y_0 = (N-1)*P_Y + D_Y \quad (1)$$

Substitute $D_Y$ and $NA_H$ (NA of the LD in the H direction) into a common formula NA=D/2f, and the focal length f1 of the collimator lens L1 is obtained.

$$f1 = D_Y/(2*NA_H) \quad (2)$$

(3) Calculating the Beam Width $X_0$ Before the Anamorphic Optical Element 3

Substitute f1 and $NA_V$ (NA of the LD in the V direction) into the common formula NA=D/2f, and the quantity $D_X$ (horizontal collimator diameter after the lens L1) is obtained.

$$D_X = 2f1*NA_V \quad (3)$$

Using the following equation (4), $X_0$ is obtained.

$$X_0 = (M-1)*P_X + D_X \quad (4)$$

(4) Calculating the Beam Reduction Rate MX of the Anamorphic Optical Element 3

MX is determined to make $X_1 = Y_0$.

Substitute f1 and $NA_V$ into the common formula NA=D/2f, and a quantity $D_X$ is obtained.

$$D_X = 2f1*NA_V \quad (3)$$

Using the following equation (5), MX is obtained.

$$MX = X_1/X_0 = Y_0/X_0 \quad (5)$$

(5) Calculating the Focal Length f2 of the Condensing Lens L2

Substitute $\sqrt{2}*X_1$ and $NA_F$ into the common formula NA=D/2f, and the focal length f2 of the condensing lens L2 is obtained.

$$f2 = (\sqrt{2}*X_1)/(2*NA_F) \quad (6)$$

(6) Calculating the Size of the Condensed Beam

First, calculate magnifications $\beta_X$, $\beta_Y$ of the optical system.

$$\beta_X = (f2/f1)*1/MX \quad (7)$$

$$\beta_Y = f2/f1 \quad (8)$$

Then, calculate the size of the condensed beam from the light emission area of the semiconductor laser LD and the magnifications $\beta_X$, $\beta_Y$ of the optical system.

$$W_X = \beta_X * EA_V \quad (9)$$

$$W_Y = \beta_Y * EA_H \quad (10)$$

(7) Confirming that the Size of the Condensed Beam is Less than that of the Core of the Optical Fiber $$W_X < FD \quad (11)$$

$$W_Y < FD \quad (12)$$

By the above design, it is possible to obtain a compact optical system that is capable of efficiently directing light beams to the optical fiber 5 having a certain NA and a certain core diameter.

It should be noted that the light source portion 1 may also be formed from light sources generating light in different wavelength regions. However, when using light sources generating light in the same wavelength region, by condensing the light beams, it is possible to transmit a high power laser beam at the same wavelength region to the optical element 5, and obtain a high power outgoing light beam from the optical element 5 at the same wavelength region.

In the above, descriptions are made of the fundamental structure of and a method of designing the optical system of the present invention. Below, specific embodiments of the present invention are explained with reference to the accompanying drawings.

First Embodiment

Figure 3A:
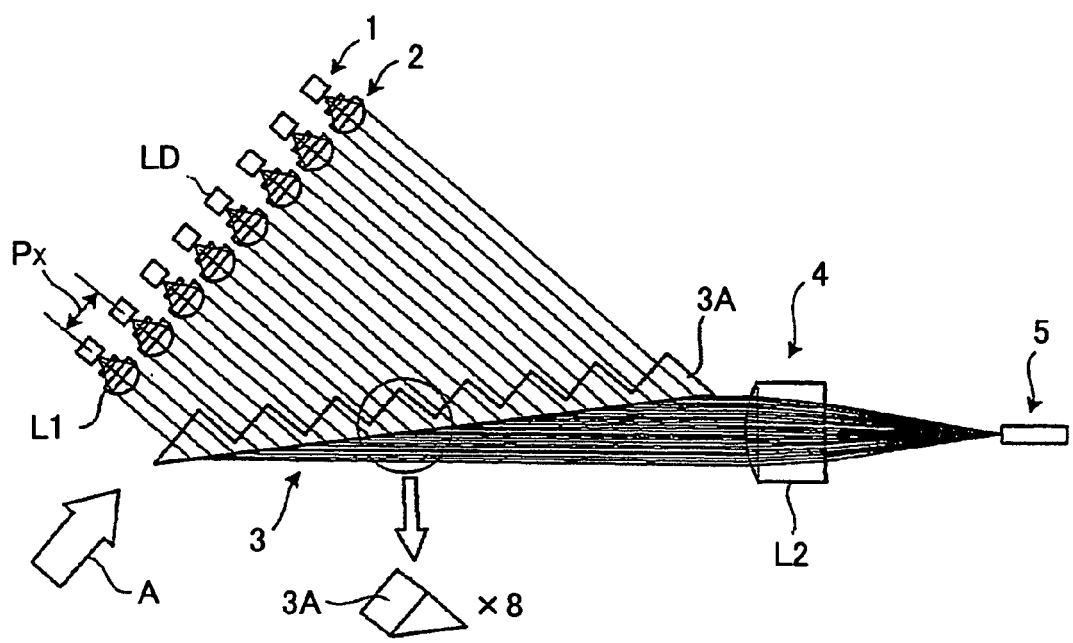
FIGS. 3A and 3B are schematic views of an optical system according to a first embodiment of the present invention, where
Figure 3B:
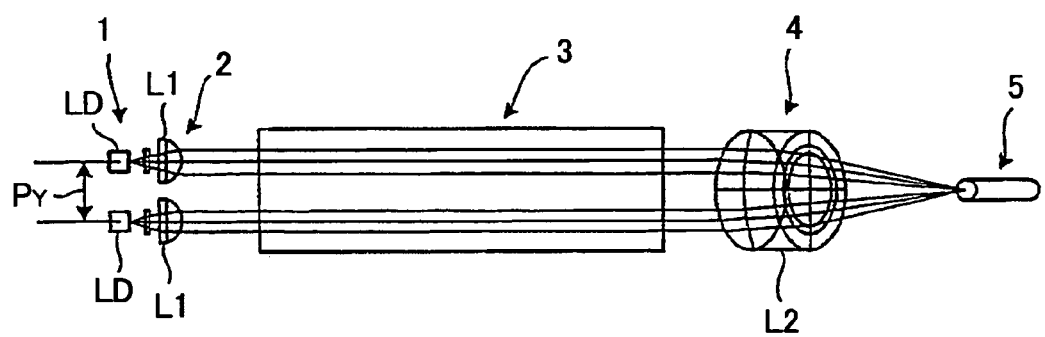

FIGS. 3A and 3B are schematic views illustrating an optical system according to a first embodiment of the present invention, where FIG. 3A is a view of the optical system in the horizontal plane, and FIG. 3B is a view of the optical system in the vertical direction viewed along an arrow A in FIG. 3A.

In the optical system illustrated in FIG. 3A and FIG. 3B, light from the light source portion 1, which includes eight light sources arranged in the horizontal direction and two light sources arranged in the vertical direction, is condensed by the light condensing portion, and is then directed to a light receiving optical element 5. The light condensing portion includes the collimator optical element 2, the anamorphic optical element 3, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 3 includes a prism array formed from eight small prisms 3A, the light-condensing optical element 4 includes one condensing lens (L2), and the light receiving optical element 5 is an optical fiber.

The details of the optical system are below.
(1) Light sources: semiconductor lasers (LD)
    LD light emission power: 30 mW
(2) LD wavelength ($\lambda$): 408±10 nm
(3) LD divergence angle:
    8 degrees in the horizontal direction
    24 degrees in the vertical direction
(4) NA ($1/e^2$) of LD:
    0.12 in the horizontal direction
    0.35 in the vertical direction
(5) light emission area of LD:
    2.2 µm in the horizontal direction
    0.7 µm in the vertical direction
(6) number of LDs:
    eight in the horizontal direction
    two in the vertical direction
(7) pitch of LDs:
    pitch in the horizontal direction ($P_X$): 7.5 mm
    pitch in the vertical direction ($P_Y$): 7.5 mm
(8) LD orientation:
    V direction of LD in the horizontal direction, and H direction of LD in the vertical direction
(9) collimator lens L1: non-spherical lens
    focal length: 5.5 mm
    effective diameter 5.5 mm
(10) anamorphic optical element:
    prism array made from quartz
    beam size reduction rate: 0.18 in the horizontal direction, 1.0 in the vertical direction
(11) condensing lens L2: non-spherical lens
    focal length: 35 mm
    effective diameter 15 mm
(12) light receiving optical element:
    multiple mode optical fiber,
    core diameter: 50 µm
    NA 0.2
(13) anti-reflection (AR) coating on incident and outgoing surfaces of all optical elements (reflectivity: <0.5%)
(14) magnification of the whole optical system:
    35.4 in the horizontal direction,
    6.4 in the vertical direction In the optical system illustrated in FIGS. 3A and 3B, the anamorphic optical element 3 is a prism array formed from a number of small prisms 3A. Because the transmission path of the beam is short in the small prisms 3A, loss of light due to absorption inside the prisms 3A is low.

In FIGS. 3A and 3B, if assuming that the total loss of light is 8% in the anti-reflection (AR) coating and due to absorption inside the optical elements, the power of the light beam from the light-receiving optical element 5 (here, an optical fiber) is 428 mW, corresponding to an efficiency of 89%.

By way of comparison, if assuming that loss of light is zero in the anti-reflection (AR) coating or due to absorption inside the optical elements, the power of the light beam from the light-receiving optical element 5 is 465 mW, corresponding to an efficiency of 97%.

Characteristic parameters of the optical system of the present embodiment according to the scheme of design described above are as follows.
(1) 8×2 Semiconductor laser array.
    Each semiconductor laser is arranged so that the width of the light emission area of the semiconductor laser along the direction of the arrangement of the eight semiconductor lasers, that is, $EA_V$ equals 0.7 µm, and the width of the light emission area of the semiconductor laser along the direction of the arrangement of the two semiconductor lasers, that is, $EA_H$ equals 2.2 µm.
(2) The object value of the thickness of the optical system, that is, $Y_0$=10 mm. From equation (1) and $Y_0$, it is obtained that $D_Y$=2.5 mm.

NA of the semiconductor laser in the horizontal direction ($NA_H$) is originally 0.12 (in units of $1/e^2$) here, however, in order to increase the efficiency, $NA_H$ is increased to 0.23. Hence, from equation (2), it is obtained that the focal length f1 of the collimator lens L1 is 5.43 mm.
(3) NA of the semiconductor laser in the vertical direction ($NA_V$) is originally 0.35 (in units of $1/e^2$) here, however, in order to increase the efficiency, $NA_V$ is increased to 0.5. Hence, from equation (3), it is obtained that $D_X$=5.5 mm. and from equation (4), it is obtained that $X_0$=58 mm.
(4) MX=10/58=0.172≈0.18
(5) f2=($\sqrt{2}$*10)/(2*0.2)=35.4≈35 mm
(6) $\beta_X$=(35/5.5)*1/0.18=35.4
    $\beta_Y$=35/5.5=6.4
    $W_X$=35.4 *0.7=24.8
    $W_Y$=6.4*2.2=14.1
(7) since FD=50 µm, it is confirmed that $W_X$<FD, and $W_Y$<FD.

Consequently, it is possible to provide an optical system that has a small thickness and a short light path and is capable of efficiently condensing light beams into an optical fiber having a certain numerical aperture NA and a certain core diameter.

Second Embodiment

Figure 4:
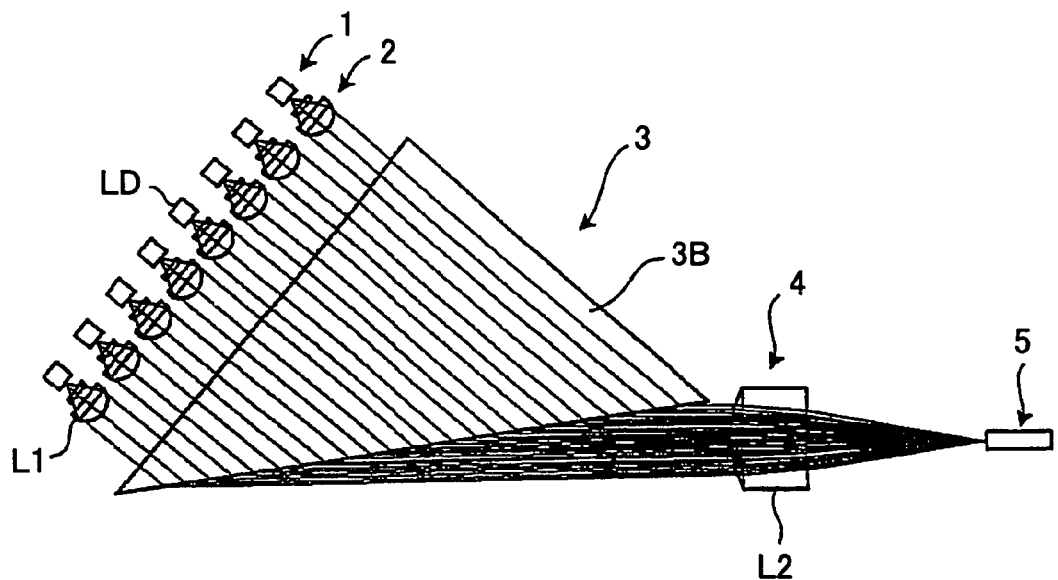
FIG. 4 is a schematic view illustrating an optical system in the horizontal plane according to a second embodiment of the present invention.

FIG. 4 is a schematic view illustrating an optical system in the horizontal plane according to a second embodiment of the present invention.

In the optical system illustrated in FIG. 4, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, the anamorphic optical element 3, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 3 includes a large-size prism 3B, the light-condensing optical element 4 includes one condensing lens (L2), and the light receiving optical element 5 is an optical fiber.

The optical system of the present embodiment is basically the same as that of the first embodiment except that the anamorphic optical element 3 in the present embodiment includes a large-size prism 3B, instead of a prism array formed from eight small prisms 3A, as in the first embodiment. Due to this, it is easy to mount and adjust the prism 3B.

In the optical system illustrated in FIG. 4, if assuming that the loss of light is totally 9.5% in the anti-reflection (AR) coating and due to absorption inside the optical elements, the power of the light beam from the light-receiving optical element 5 (here, an optical fiber) is 421 mW, corresponding to an efficiency of 88%.

Third Embodiment

Figure 5:
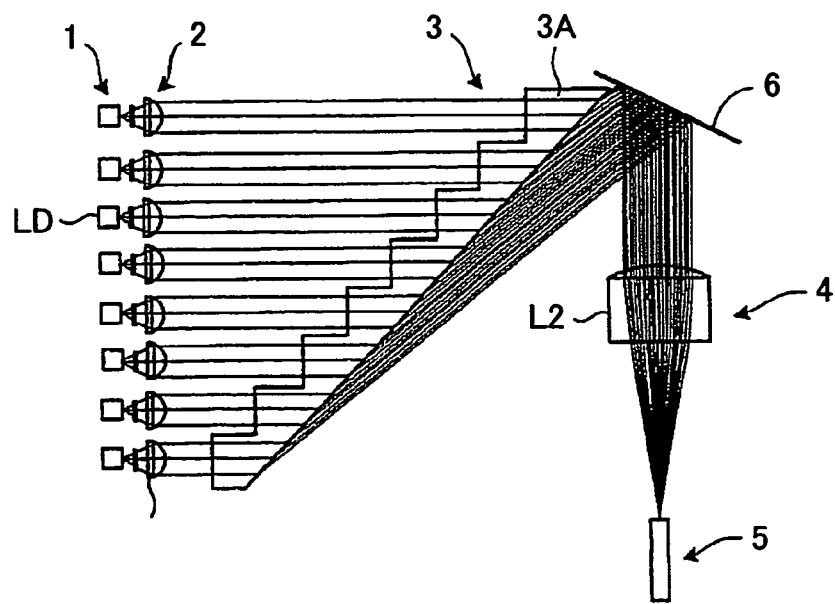
FIG. 5 is a schematic view illustrating an optical system in the horizontal plane according to a third embodiment of the present invention.

FIG. 5 is a schematic view illustrating an optical system in the horizontal plane according to a third embodiment of the present invention.

In the optical system illustrated in FIG. 5, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, the anamorphic optical element 3, a reflection optical element 6, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 3 includes a prism array formed from eight small prisms 3A, the reflection optical element 6 includes a reflecting mirror, the light-condensing optical element 4 include one condensing lens (L2), and the light receiving optical element 5 is an optical fiber.

The optical system of the present embodiment is basically the same as that of the first embodiment except that the reflection optical element 6 is arranged between the anamorphic optical element 3 and the light-condensing optical element 5 in the present embodiment. The reflection optical element 6 is used to reflect the light beam so as to change the direction of light beam.

In the optical system illustrated in FIG. 5, if assuming that the reflectivity of the reflection optical element 6 is 99%, and the loss of light is totally 9% in the anti-reflection (AR) coating and due to absorption inside the optical elements, the power of the light beam from the light-receiving optical element 5 (here, an optical fiber) is 423 mW, corresponding to an efficiency of 88%.

Fourth Embodiment

Figure 6:
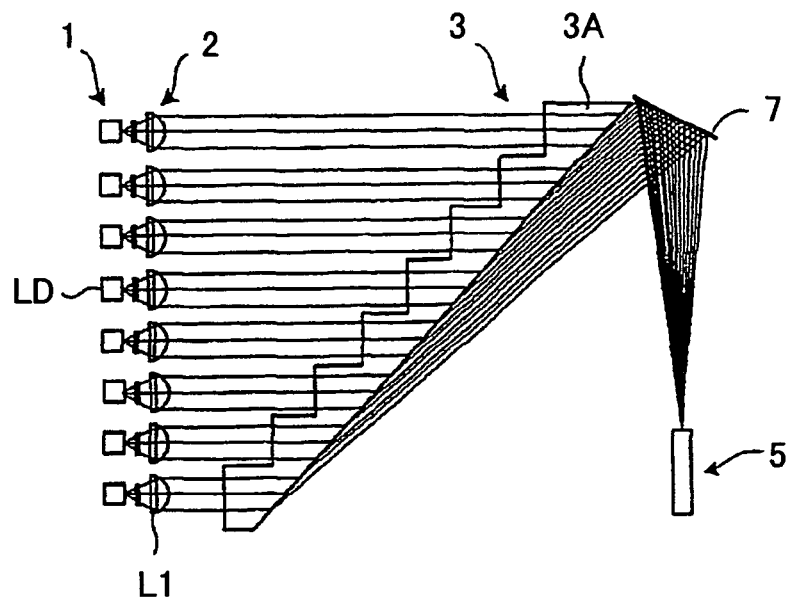
FIG. 6 is a schematic view illustrating an optical system in the horizontal plane according to a fourth embodiment of the present invention.

FIG. 6 is a schematic view illustrating an optical system in the horizontal plane according to a fourth embodiment of the present invention.

In the optical system illustrated in FIG. 6, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, the anamorphic optical element 3, and a reflection condensing optical element 7.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 3 includes a prism array formed from eight small prisms 3A, the reflection condensing optical element 7 includes a concave lens, and the light receiving optical element 5 is an optical fiber.

The optical system of the present embodiment is basically the same as that of the third embodiment except that instead of the reflection optical element 6 and the light-condensing optical element 4 in the third embodiment, the reflection condensing optical element 7 is arranged which integrates functions of the reflection optical element 6 and the light-condensing optical element 4.

Due to this, one optical element is removed, and this makes it possible to further reduce the size and cost of the optical system compared with the third embodiment.

In the optical system illustrated in FIG. 6, if assuming that the reflectivity of the reflection condensing optical element 7 is 99%, and the loss of light is totally 4% in the anti-reflection (AR) coating and due to absorption inside the optical elements, the power of the light beam from the light-receiving optical element 5 (here, an optical fiber) is 446 mW, corresponding to an efficiency of 93%. That is, because of absence of the condensing lens, loss of light due to absorption in the optical elements is lowered, thus increasing the power of the light beam from the light-receiving optical element 5.

Fifth Embodiment

Figure 7:
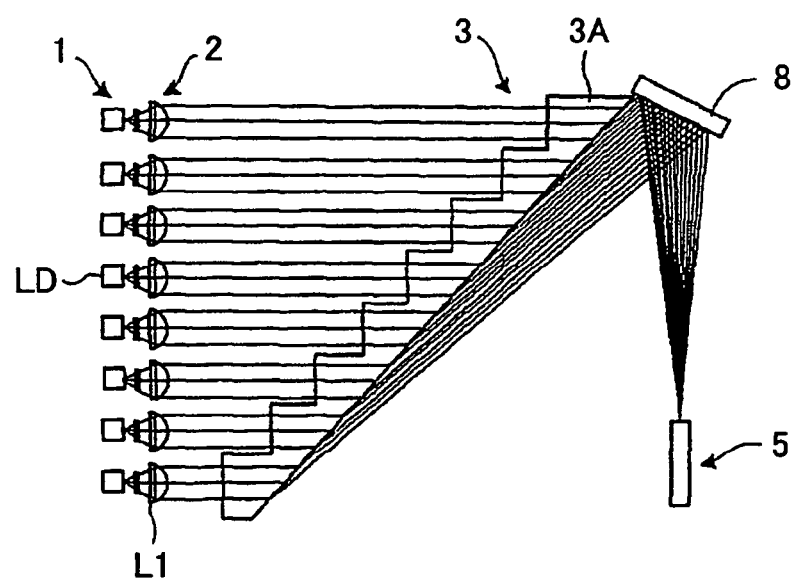
FIG. 7 is a schematic view illustrating an optical system in the horizontal plane according to a fifth embodiment of the present invention.

FIG. 7 is a schematic view illustrating an optical system in the horizontal plane according to a fifth embodiment of the present invention.

In the optical system illustrated in FIG. 7, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, the anamorphic optical element 3, and a reflection condensing optical element 8.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 3 includes a prism array formed from eight small prisms 3A, the reflection condensing optical element 8 includes a hologram element, and the light receiving optical element 5 is an optical fiber.

The optical system of the present embodiment is basically the same as that of the third embodiment except that instead of the reflection optical element 6 and the light-condensing optical element 4 in the third embodiment, the hologram element 8 is arranged which integrates functions of the reflection mirror 6 and the condensing lens 4.

Due to this, one optical element is removed, and this makes it possible to further reduce the size and cost of the optical system compared with the third embodiment.

In the optical system illustrated in FIG. 7, because essentially there is not loss of light in the hologram element 8, if assuming that the loss of light is totally 8% in the anti-reflection (AR) coating and due to absorption inside the optical elements, the power of the light beam from the light-receiving optical element 5 (here, an optical fiber) is 446 mW, corresponding to an efficiency of 93%. That is, because of absence of the condensing lens and usage of the hologram element 8, loss of light due to absorption in the optical elements is lowered, thus increasing the power of the light beam from the light-receiving optical element 5.

Sixth Embodiment

Figure 8:
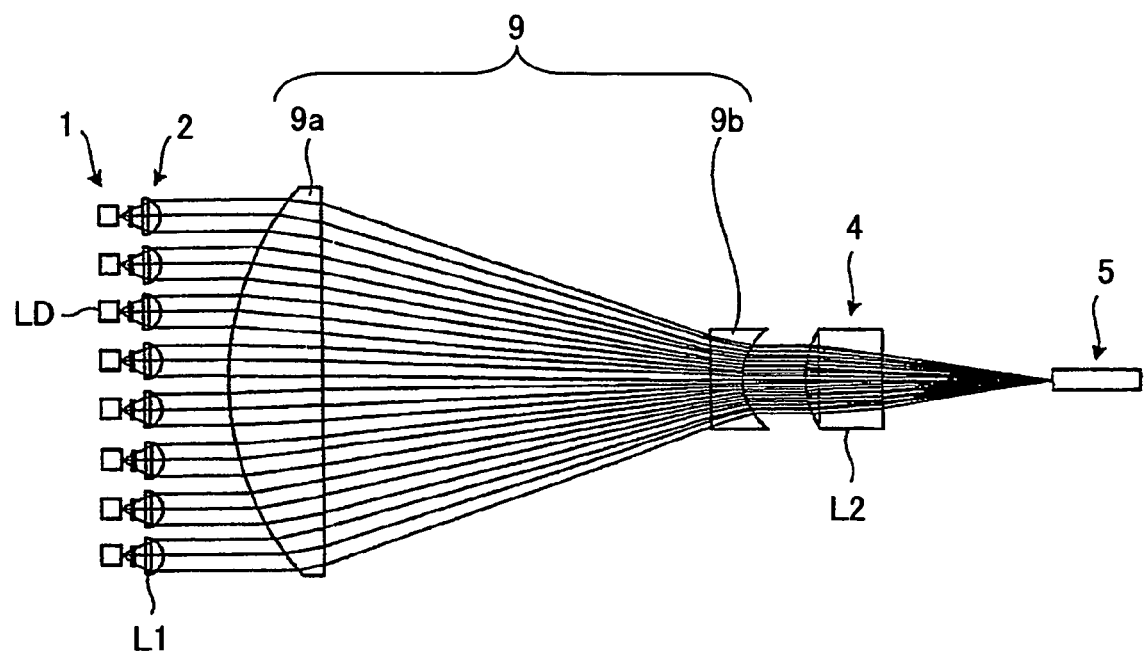
FIG. 8 is a schematic view illustrating an optical system in the horizontal plane according to a sixth embodiment of the present invention.

FIG. 8 is a schematic view illustrating an optical system in the horizontal plane according to a sixth embodiment of the present invention.

In the optical system illustrated in FIG. 8, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, an anamorphic optical element 9, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 9 includes two cylindrical lenses 9a and 9b, the light-condensing optical element 4 include one condensing lens (L2), and the light receiving optical element 5 is an optical fiber.

The optical system of the present embodiment is basically the same as that of the first embodiment except that the anamorphic optical element 9 is formed from two cylindrical lenses 9a and 9b in the present embodiment instead of a prism array as in the first embodiment.

In the optical system illustrated in FIG. 8, if assuming that the loss of light is totally 19% in the anti-reflection (AR) coating and due to absorption inside the optical elements, the power of the light beam from the light-receiving optical element 5 (here, an optical fiber) is 377 mW, corresponding to an efficiency of 79%. That is, when using the anamorphic optical element 9 formed from two cylindrical lenses 9a and 9b, since loss of light due to absorption in the cylindrical lenses 9a and 9b and other optical elements is greater, the efficiency of light transmission decreases more or less, and the power of the light beam from the light-receiving optical element 5 (here, an optical fiber) decreases.

Seventh Embodiment

Figure 9:
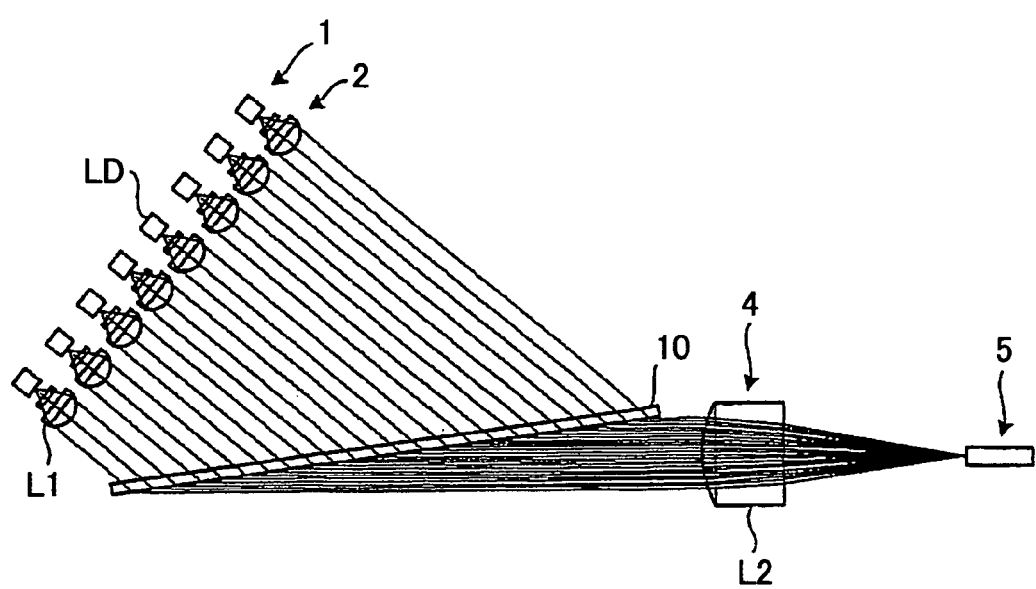
FIG. 9 is a schematic view illustrating an optical system in the horizontal plane according to a seventh embodiment of the present invention.

FIG. 9 is a schematic view illustrating an optical system in the horizontal plane according to a seventh embodiment of the present invention.

In the optical system illustrated in FIG. 9, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, an anamorphic optical element 10, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 10 includes a diffractive optical element, the light-condensing optical element 4 include one condensing lens (L2), and the light receiving optical element 5 is an optical fiber.

The optical system of the present embodiment is basically the same as that of the first embodiment except that the anamorphic optical element 10 is formed from a diffractive optical element in the present embodiment instead of a prism array as in the first embodiment.

In the optical system illustrated in FIG. 9, because there is essentially not any light loss in the diffractive element 10, if assuming that the loss of light is totally 8% in the anti-reflection (AR) coating and due to absorption inside the optical elements, the power of the light beam from the light-receiving optical element 5 (here, an optical fiber) is 426 mW, corresponding to an efficiency of 89%.

Therefore, when using the anamorphic optical element 10 formed from a diffractive element, it is possible to make the optical system small and light compared with the optical system employing the anamorphic optical element 9 formed from two cylindrical lenses 9a and 9b.

Eighth Embodiment

Figure 10A:
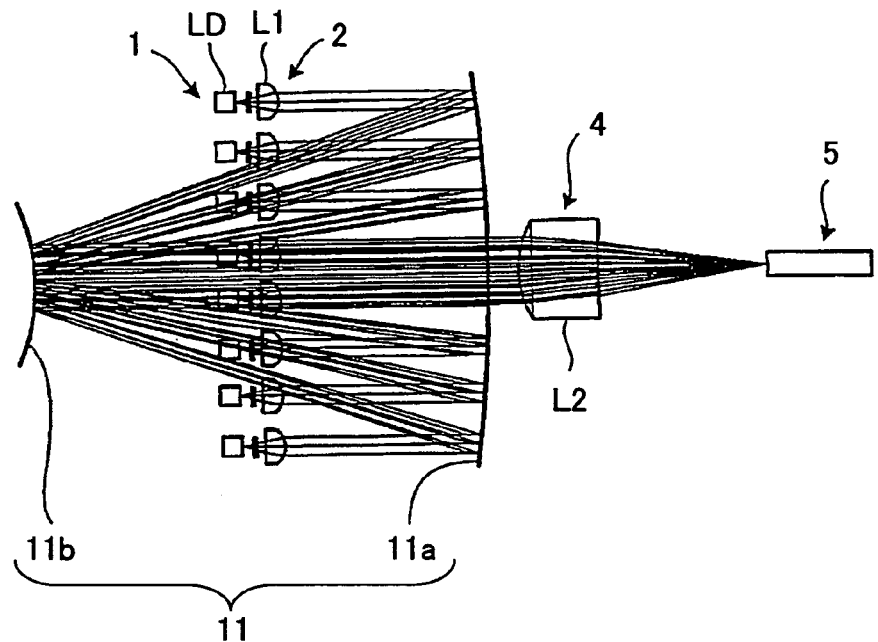
FIGS. 10A and 10B are schematic views illustrating an optical system according to an eighth embodiment of the present invention, where
Figure 10B:
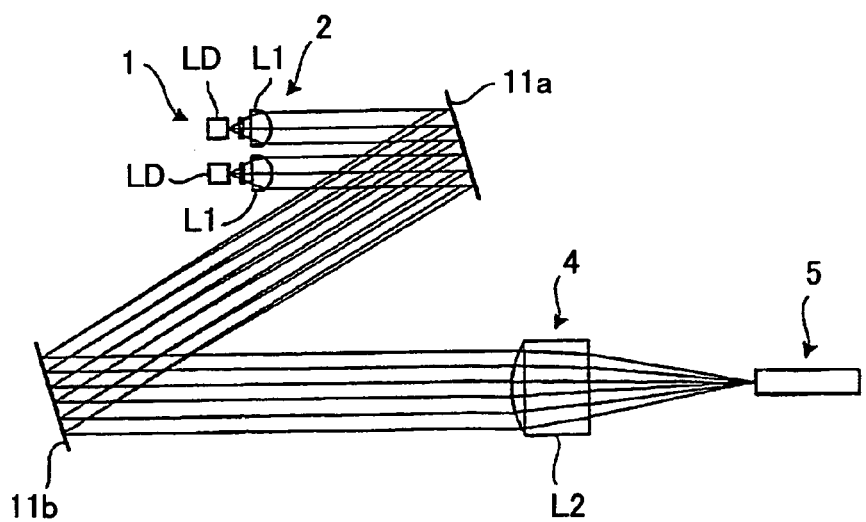

FIGS. 10A and 10B are schematic views illustrating an optical system according to an eighth embodiment of the present invention, where FIG. 10A is a view of the optical system in the horizontal plane, and FIG. 10B is a view of the optical system in the vertical direction.

In the optical system illustrated in FIG. 10A and FIG. 10B, the same as that in the first embodiment, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, an anamorphic optical element 11, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 11 includes two cylindrical mirrors 11a and 11b, the light-condensing optical element 4 include one condensing lens (L2), and the light receiving optical element 5 is an optical fiber.

The optical system of the present embodiment is basically the same as that of the first embodiment except that the anamorphic optical element 11 is formed from two cylindrical mirrors 11a and 11b in the present embodiment instead of a prism array as in the first embodiment.

In the optical system illustrated in FIGS. 10A and 10B, if assuming that the loss of light is totally 9% in the anti-reflection (AR) coating and due to absorption inside the optical elements, the power of the light beam from the light-receiving optical element 5 (here, an optical fiber) is 423 mW, corresponding to an efficiency of 88%.

Ninth Embodiment

Figure 11A:
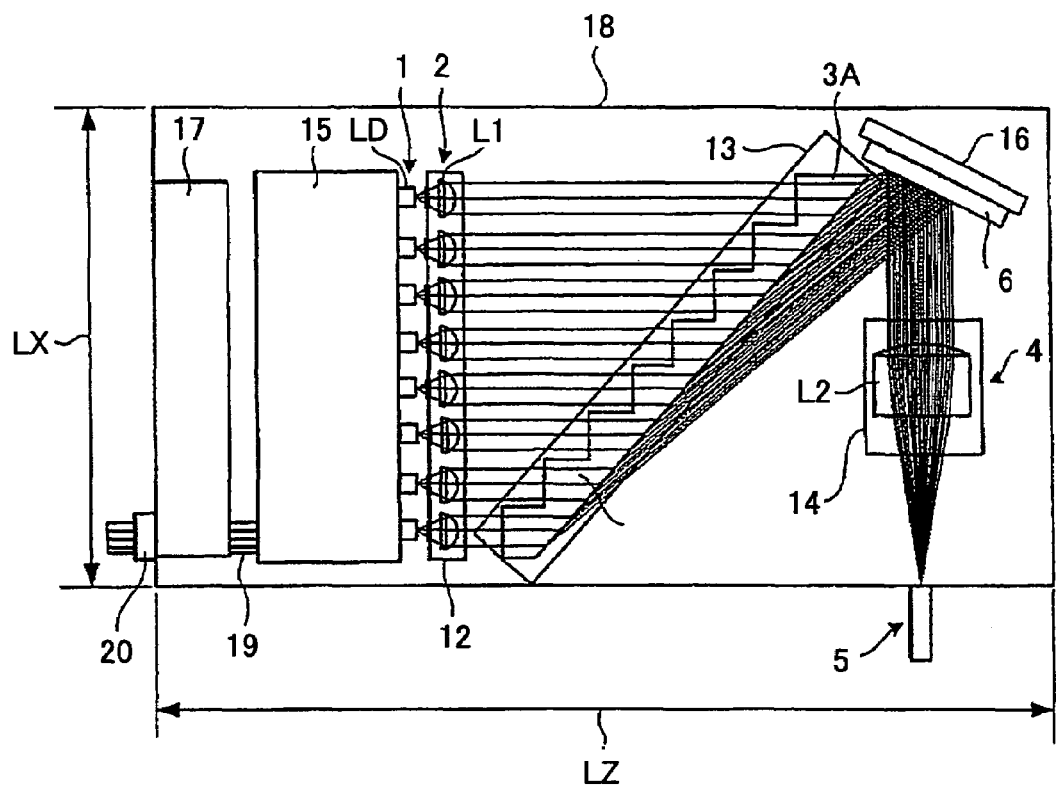
FIGS. 11A and 11B are a top view and a side view of a light source module according to a ninth embodiment of the present invention.
Figure 11B:
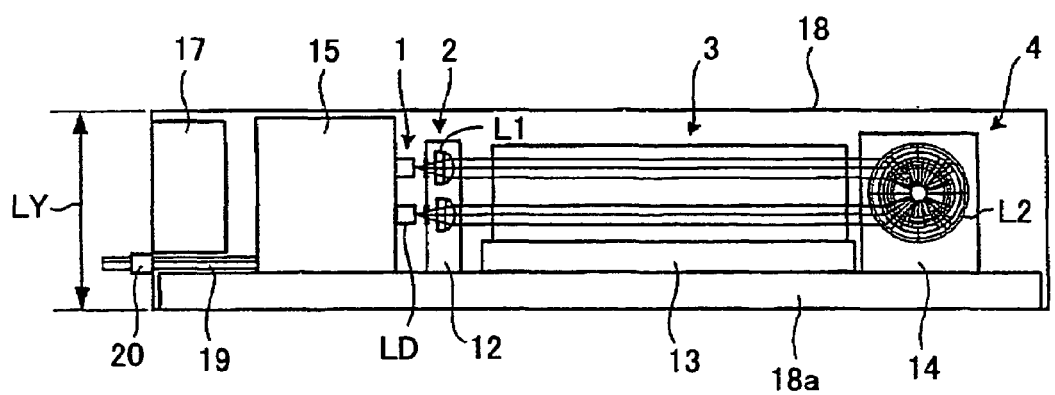

FIGS. 11A and 11B are a top view and a side view of a light source module according to a ninth embodiment of the present invention.

In the present embodiment, the light source module includes an optical system as disclosed in the third embodiment (FIG. 5) accommodated in a housing 18.

That is, in the optical system of the light source module illustrated in FIG. 11A and FIG. 11B, light from the light source portion 1, which includes eight light sources arranged in the horizontal direction and two light sources arranged in the vertical direction, is condensed by the light condensing portion, and is then directed to a light receiving optical element 5.

The light condensing portion includes the collimator optical element 2, the anamorphic optical element 3, a reflection optical element 6, and the light-condensing optical element 4.

Specifically, the light source portion 1 includes 8×2 semiconductor lasers (LD) which generate laser beams in the same wavelength region. In the light condensing portion, the collimator optical element 2 includes 8×2 collimator lenses L1, the anamorphic optical element 3 includes a prism array formed from eight small prisms 3A, the reflection optical element 6 includes a reflecting mirror, the light-condensing optical element 4 includes one condensing lens (L2), and the light receiving optical element 5 is an optical fiber.

In addition, the 16 semiconductor lasers are mounted on a block 15 for driving the semiconductor lasers and releasing heat, the sixteen collimator lenses L1 are mounted on a mounting member 12, the prism array of eight prisms 3A of the anamorphic optical element 3 is mounted on a mounting member 13, the reflecting mirror 6 is mounted on a mounting member 16, the condensing lens L2 is mounted on a mounting member 14, and the optical fiber 5 is fixed to the side wall of the housing 18. The above mounting members are fixed on a base member 18a of the housing 18.

A fan 17 is installed near the block 15 to cool the block 15. Cables 19 from the block 15 and the fan 17 are connected to a connector 20 fixed on the housing 18. In addition, not-illustrated cables from a controller and a power cable are connected to the connector 20.

In the present embodiment, by employing the optical system in the third embodiment, it is possible to realize a thin and small light source module having high output power.

As an example, the dimensions of the housing in FIGS. 11A and 11B are as follows: LX=105 mm, LY=40 mm, LZ=165 mm.

Certainly, instead of the optical system of the third embodiment, any optical system of other embodiments of the present invention may also be installed in a housing to form a light source module.

10th Embodiment

Figure 12:
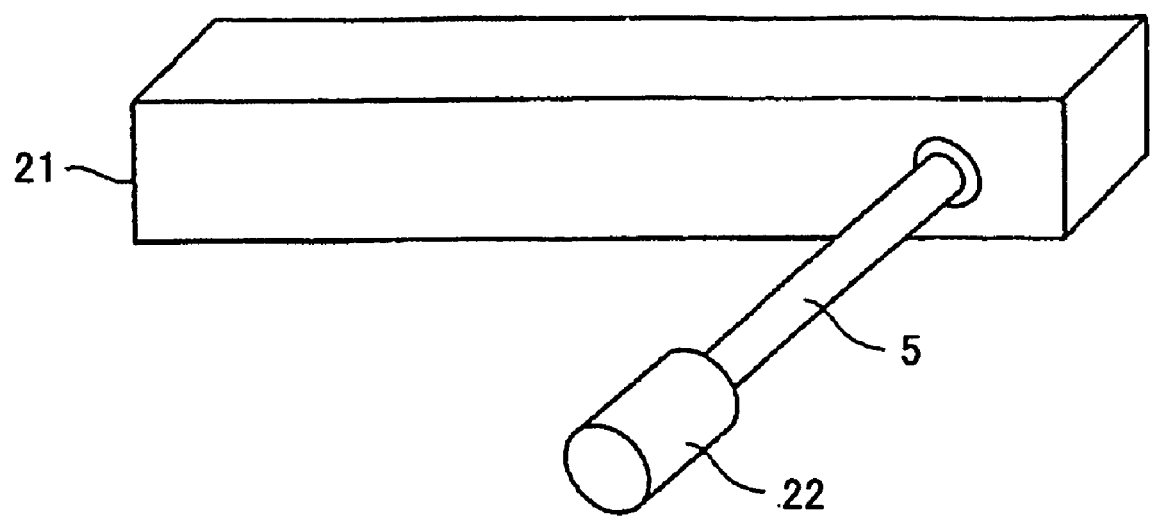
FIG. 12 is a perspective view of a light source module according to a 10th embodiment of the present invention.

FIG. 12 is a perspective view of a light source module according to a 10th embodiment of the present invention.

In the present embodiment, the light source module 21 is basically the same as that in the ninth embodiment, except that an optical element 22 is provided at an output end of the optical fiber 5.

The optical element 22 may be a condensing coaxial optical element or a condensing anamorphic optical element to condense the outgoing light beam from the light-receiving optical element 5. The beam condensed by the optical element 22 is illustrated in FIG. 13 in terms of illuminance distribution and beam shape.

The optical element 22 may also be a collimator coaxial optical element or a collimator anamorphic optical element to covert the outgoing light beam from the light-receiving optical element 5 to a parallel beam, which is illustrated in FIG. 14 in terms of illuminance distribution and beam shape.

The optical element 22 may also be a divergent coaxial optical element or a divergent anamorphic optical element to diverge the outgoing light beam from the light-receiving optical element 5. The thus obtained diverged beam is illustrated in FIG. 15 in terms of illuminance distribution and beam shape.

Furthermore, an illuminance unification optical element may be provided at the output end of the optical element 22 to make the illuminance distribution of the outgoing light beam from the optical element 22 uniform. For example, the illuminance unification optical element may be a diffusion plate, a lens, a hologram, or others.

The influences of the illuminance unification optical element on the outgoing light beam are also illustrated in FIG. 13 through FIG. 15.

Further, the illuminance unification optical element may also be provided at the output end of the light-receiving optical element 5 to make the light beam from the light-receiving optical element 5 uniform.

The optical element 22 and the illuminance unification optical element may be appropriately installed in the light source module of the present invention depending on the applications.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

According to the present invention, it is possible to provide an optical system that can be made compact and is capable of efficiently condensing light from plural light sources into a light-receiving optical element, and a light source module that is compact and has high output power.

The optical system and the light source module according to the present invention can be used in applications related to optical communication, optical computers, laser processing, photo-lithography, illumination, image display, optical molding, medical services, and many other fields.

This patent application is based on Japanese Priority Patent Application No. 2003-348287 filed on Oct. 7, 2003, the entire contents of which are hereby incorporated by reference.

What is claimed is:

1. An optical system, comprising:
    a plurality of separate light sources that are separately arranged as an array with a number M of the light sources arranged in a first direction and a number N of the light sources arranged in a second direction where M>N, and M, N>1, each of the light sources having an asymmetric light emission area;
    a collimator optical element that converts the light beams from the light sources into parallel beams, the light sources being arranged so that a light beam passing said collimator optical element has a beam width in the first direction greater than a beam width in the second direction;
    an anamorphic optical element that is arranged to have a beam-size reduction rate in the first direction greater than a beam-size reduction rate in the second direction so as to convert the plurality of light beams from the light sources into a light beam having a symmetric beam cross-section; and
    a light-condensing optical element that condenses the light beam having the symmetric beam cross-section into a light receiving element,
    wherein the anamorphic optical element includes an array of a number of prisms integrally arranged.

2. The optical system as claimed in claim 1, wherein a reflection optical element is arranged between the anamorphic optical element and the light-condensing optical element.

3. The optical system as claimed in claim 2, wherein the light-condensing optical element and the reflection optical element are integrated to be a reflection-condensing optical element.

4. The optical system as claimed in claim 3, wherein the reflection-condensing optical element includes at least one of a concave mirror and a hologram element.

5. The optical system as claimed in claim 1, wherein the light-condensing optical element includes at least one of a condensing lens, a lens having a refractive index distribution, a Fresnel lens, a diffractive optical element, and a hologram element.

6. The optical system as claimed in claim 5, wherein the light-condensing optical element includes at least one of a glass lens fabricated by grinding, a glass molded lens, a resin molded lens, and a lens fabricated by etching.

7. The optical system as claimed in claim 1, wherein
each of the light sources include a semiconductor laser, and
the light-receiving optical element includes an optical fiber.

8. The optical system as claimed in claim 7, wherein a core of the optical fiber has a diameter less than 100 µm, and a numerical aperture (NA) less than 0.35.

9. The optical system as claimed in claim 1, wherein each of the light sources include at least one of a light emission diode, an electro-luminescence emitter, a VCSEL (Vertical Cavity Surface Emitting Laser), and a lamp.

10. The optical system as claimed in claim 1, wherein the light beams include light beams output from an optical fiber or an light wave guide into which propagates light emitted from at least one of a semiconductor laser, a light emission diode, an electro-luminescence emitter, a VCSEL (Vertical Cavity Surface Emitting Laser), and a lamp.

11. The optical system as claimed in claim 1, wherein the light-receiving optical element is an optical element having an opening.

12. The optical system as claimed in claim 1, wherein the anamorphic optical element includes at least one of a cylindrical lens, a cylindrical mirror, a hologram element, and a diffractive optical element.

13. The optical system as claimed in claim 1, wherein the collimator optical element includes at least one of a collimator lens, a lens having a refractive index distribution, a Fresnel lens, a diffractive optical element, and a hologram element.

14. The optical system as claimed in claim 1, wherein the collimator optical element includes at least one of a glass lens fabricated by grinding, a glass molded lens, a resin molded lens, and a lens fabricated by etching.

15. The optical system as claimed in claim 1, wherein the collimator optical element includes one of an assembly of a plurality of single lenses and an integrated lens array.

16. A light source module including a power combination optical system, wherein the power combination optical system comprises:
a plurality of light sources that are arranged as an array with a number M of the light sources arranged in a first direction and a number N of the light sources arranged in a second direction where M>N, and M, N>1, each of the light sources having an asymmetric light emission area;
a collimator optical element that converts the light beams from the light sources into parallel beams, the light sources being arranged so that a light beam passing said collimator optical element has a beam width in the first direction greater than a beam width in the second direction;
an anamorphic optical element that is arranged to have a beam-size reduction rate in the first direction greater than a beam-size reduction rate in the second direction so as to convert the plurality of light beams from the light sources into a light beam having a symmetric beam cross-section; and
a light-condensing optical element that condenses the light beam having the symmetric beam cross-section into a light receiving element,
wherein the anamorphic optical element includes an array of a number of prisms integrally arranged.

17. The light source module as claimed in claim 16, further comprising a beam-processing optical element provided at an output end of the light-receiving optical element for processing a light beam from the light-receiving optical element.

18. The light source module as claimed in claim 17, wherein the beam-processing optical element includes one of a condensing coaxial optical element and a condensing anamorphic optical element to condense the light beam from the light-receiving optical element.

19. The light source module as claimed in claim 17, wherein the beam-processing optical element includes one of a collimator coaxial optical element and a collimator anamorphic optical element to covert the light beam from the light-receiving optical element to a parallel light beam.

20. The light source module as claimed in claim 17, wherein the beam-processing optical element includes one of a divergent coaxial optical element and a divergent anamorphic optical element to diverge the light beam from the light-receiving optical element.

21. The light source module as claimed in claim 17, further comprising an illuminance unification optical element that makes uniform an illuminance distribution of the light beam from the light-receiving optical element or the light beam from the beam-processing optical element.

* * * * *